(12) United States Patent
Butler (10) Patent No.: US 9,932,061 B2
(45) Date of Patent: Apr. 3, 2018

(54) STEERING COLUMN ASSEMBLY (71) Applicant: TRW Limited, Solihull West Midlands (GB)

(72) Inventor: Stephen Butler, Wolverhampton Staffordshire (GB)

(73) Assignee: TRW Limited, Solihull West Midlands (GB)

( * ) Notice: Subject to any disclaimer, the term of this patent is extended or adjusted under 35 U.S.C. 154(b) by 0 days.

(21) Appl. No.: 14/901,258

(22) PCT Filed: Jun. 25, 2014

(86) PCT No.: PCT/GB2014/051944
§ 371 (c)(1),
(2) Date: Dec. 28, 2015

(87) PCT Pub. No.: WO2014/207464
PCT Pub. Date: Dec. 31, 2014

(65) Prior Publication Data
US 2016/0368523 A1 Dec. 22, 2016

(30) Foreign Application Priority Data

Jun. 28, 2013 (GB) .................................. 1311662.9

(51) Int. Cl.
*B62D 1/184* (2006.01)
*B62D 1/187* (2006.01)
(52) U.S. Cl.
CPC ............. *B62D 1/184* (2013.01); *B62D 1/187* (2013.01)
(58) Field of Classification Search
CPC . B62D 1/184; B62D 1/187; F16B 7/14; F16B 7/1427; F16B 2007/16
See application file for complete search history.

(56) References Cited

U.S. PATENT DOCUMENTS 5,088,767 A * 2/1992 Hoblingre ................. F16B 2/16
280/775
5,394,767 A * 3/1995 Hoblingre ............... B62D 1/184
188/72.7
(Continued)

FOREIGN PATENT DOCUMENTS

DE 202012102159 U1 8/2012
FR 2822782 A1 10/2002
(Continued)

OTHER PUBLICATIONS

Patents Act 1977, Search Report under Section 17(5), Application No. GB1311662.9 dated Dec. 5, 2013.
(Continued)

*Primary Examiner* — Laura Freedman
(74) *Attorney, Agent, or Firm* — McMillan, Sobanski & Todd, LLC (57) ABSTRACT

A steering column assembly comprises an adjustable shroud and a locking mechanism that comprises a clamp pin, a locking handle and a cam mechanism fitted to the clamp pin, in which the cam mechanism comprises first and second cam portions which can be moved relative to each other by operation of the locking handle to vary the overall length of the cam mechanism, the unlocked position of the cam mechanism being defined by contact of a first end stop of the first cam portion with a second end stop of the second cam portion. At least one of the end stops comprises a resilient cushioning member which provides cushioning as the at least one end stop engages the other end stop upon the locking mechanism reaching the unlocked position. The resilient cushioning member is free to move so that on a first engagement, a portion of the resilient cushioning member makes contact with the end stop; and on a second engage- (Continued)

ment, a different portion of the resilient cushioning member makes contact with the end stop.

14 Claims, 6 Drawing Sheets

(56) References Cited

U.S. PATENT DOCUMENTS

| | | | | |
|---|---|---|---|---|
| 5,570,610 | A * | 11/1996 | Cymbal | B62D 1/184 |
| | | | | 74/493 |
| 7,533,594 | B2 * | 5/2009 | Menjak | B62D 1/184 |
| | | | | 280/775 |
| 7,717,011 | B2 * | 5/2010 | Hirooka | B62D 1/184 |
| | | | | 280/777 |
| 8,590,932 | B2 * | 11/2013 | Dietz | B60R 21/09 |
| | | | | 280/775 |
| 9,032,835 | B2 * | 5/2015 | Davies | B62D 1/184 |
| | | | | 74/493 |
| 9,079,612 | B2 * | 7/2015 | Wilkes | B62D 1/184 |
| 9,150,240 | B2 | 10/2015 | Schnitzer et al. | |
| 9,260,131 | B2 * | 2/2016 | Wilkes | B62D 1/184 |
| 9,522,693 | B2 * | 12/2016 | Tomaru | B62D 1/184 |
| 2005/0016314 | A1 | 1/2005 | Kinme et al. | |
| 2015/0353122 | A1 * | 12/2015 | Davies | B62D 1/184 |
| | | | | 24/542 |

FOREIGN PATENT DOCUMENTS

| | | | |
|---|---|---|---|
| GB | 2311839 A | 10/1997 | |
| JP | 2007137180 A * | 6/2007 | B62D 1/184 |
| WO | 2013/001284 A1 | 1/2013 | |

OTHER PUBLICATIONS

PCT International Search Report and the Written Opinion, Application No. PCT/GB2014/051944 filed Jun. 25, 2014, dated Oct. 13, 2014.

* cited by examiner

STEERING COLUMN ASSEMBLY

CROSS-REFERENCE TO RELATED APPLICATIONS

This application is a national stage of International Application No. PCT/GB2014/051944, filed Jun. 25, 2014, the disclosures of which are incorporated herein by reference in entirety, and which claimed priority to Great Britain Patent Application No. 1311662.9, filed Jun. 28, 2013, the disclosures of which are incorporated herein by reference in entirety.

BACKGROUND OF THE INVENTION

This invention relates to improvements in steering column assemblies.

It is known to provide a steering column assembly. The assembly can be adjusted for reach allowing the steering wheel to move towards and away from a driver, or for rake allowing the steering wheel to be moved upwards and downwards relative to the driver. This allows for a comfortable driving position to be achieved and, where provided, for the optimum positioning of a driver airbag attached to the steering wheel relative to the torso of the driver. A steering column that adjusts for reach or rake is known as a single adjust assembly, and one that adjusts for both is known as a double adjust assembly. It is important that the assembly is easy to adjust when required and yet fixed rigidly in position when the vehicle is being driven. This is achieved by providing a steering column shroud which surrounds a steering column shaft that supports the steering wheel. The shroud is fixed in position by a releasable locking assembly. When the locking assembly is in a locked condition, the shroud and the wheel are fixed relative to a part of the vehicle, typically the bulkhead. When it is in an unlocked position the shroud is free to move relative to the bulkhead so that the position of the wheel can be adjusted.

Several locking assemblies are known, but a most common type includes a locking mechanism which can be released or locked to a clamp pin or bolt by rotation of a handle attached. The handle is fixed to a first part of a cam mechanism which rotates with the handle about the axis of the clamp pin or bolt. A second part of the cam mechanism is prevented from rotating and co-operates with the first part. Rotating the handle moves the two cam parts relative to each other, which increases or decrease the overall length of the cam mechanism depending on which way the handle is rotated. This change in length of the cam mechanism provides the locking function of the locking assembly.

BRIEF SUMMARY OF THE INVENTION

According to a first aspect the invention provides a steering column assembly comprising an adjustable shroud which at least partially surrounds a steering shaft and a locking mechanism. The locking mechanism may be operable between a locked position in which the adjustable shroud part is locked in position and an unlocked position in which the adjustable shroud part can be moved to set the reach and/or rake of the steering column assembly. This locking mechanism may comprise a clamp pin, a locking handle and a cam mechanism fitted to the clamp pin. The cam mechanism preferably comprises first and second cam portions which can be moved relative to each other by operation of the locking handle to vary the overall length of the cam mechanism. The unlocked position of the cam mechanism is preferably defined by contact of a first end stop of the first cam portion with a second end stop of the second cam portion, wherein at least one of the end stops comprises a resilient cushioning member which provides cushioning as the at least one end stop engages the other end stop upon the locking mechanism reaching the unlocked position. The resilient cushioning member may be free to move relative to the end stop such that on a first engagement, a portion of the resilient cushioning member makes contact with the end stop and on a second engagement, a different portion of the resilient cushioning member makes contact with the end stop.

In a first arrangement of the invention, the movement may be caused by the force placed upon the resilient cushioning member during engagement between the at least one end stop and the other end stop.

The movement may be caused by vibrations acting upon the fitted resilient cushioning member.

The resilient cushioning member preferably comprises a rubber member.

The first end stop may comprise a protrusion of the first cam portion.

The resilient cushioning member may comprise an O-ring which is fitted over the protrusion. It may be a loose fit to permit the required relative movement, or the protrusion itself may be free to move relative to the cam portion of which it is a part. The protrusion may have an axis and may rotate about its axis.

By providing a resilient cushioning member that comprises a ring, such as an O-ring which is loosely fitted, the arrangement allows for reduced friction upon rotation of the O-ring.

Preferably, engagement between the at least one end stop and the other end stop may create an oblique force which acts upon the O-ring causing rotation of the O-ring about its axis around the protrusion There may be a groove on the end stop which locates the O-ring, to prevent it from falling off the protrusion. The O-ring may be located at least partially within the groove.

The first end stop most preferably may comprise a protrusion of the first cam portion and the resilient cushioning member may comprise an O-ring which is a fitted over the protrusion.

The second cam portion may comprise a moving cam portion which rotates with the clamp pin as the handle is operated and the first cam portion comprises a fixed cam portion which is restrained so that it cannot rotate.

One of the cam portions may include a cam and the other of the cam portions may include a cam follower which moves over the cam as the handle rotates to change the length of the cam mechanism.

The applicant has appreciated that providing a resilient cushioning member as part of the end stop or the part of the other cam part can reduce the noise that would otherwise occur as the cam reaches the fully open position.

The resilient cushioning member may comprise a rubber or other relatively soft material member, whereas the first and second cam parts may comprise sintered metal components. It may be releasable from the rest of the end stop or integrally formed, perhaps by being moulded in place. It may even be possible in some arrangements for the whole of the end stop to be a resilient cushioning member. By member we may mean one single part or a collection of parts.

The O-ring may be a simple push fit over the protrusion. A groove may be provided on the end stop to help keep the O-ring in substantially the same position.

The assembly may include means for permitting the o-ring to rotate in one direction whilst restricting rotation of the o-ring in the return direction. The means may completely restrict the o-ring from rotating in the return direction or making it harder for the o-ring to rotate in the return direction compared with the other direction.

The assembly may be arranged so that a part of the protrusion that contacts the inside diameter of the O-ring may include a plurality of ridges or teeth that extend across the O-ring and which grip the O-ring when the O-ring tries to rotate in one direction and which provide less grip on the O-ring when it tries to rotate in the other direction. The ridges may form asymmetric teeth. Similar ridges may be provided instead, or in addition, on the inside diameter of the O-ring. This is especially advantageous when combined with the feature of the tangential force being applied to the cushioning member, as each time it is closed the O-ring will be urged around the protrusion by a small amount and will then be prevented from moving back as the teeth on the protrusion (or inside of the ring) grip it in place.

The applicant has appreciated that the movement of the resilient cushioning member of the invention leads to, in at least one construction, evenly distributed wear of the resilient cushioning member. This in turn leads to an extended lifetime of the resilient cushioning member. For example, in a preferable arrangement, in which the resilient cushioning member is an O-ring about a protrusion, its free rotation leads to more evenly distributed wear of the outer surface of the O-ring, thus leading to extended life of the O-ring.

Each engagement compresses the resilient cushioning member. Between engagements, there may be no overlap of the portion compressed on the resilient cushioning member relative to the previous engagement, or substantially no overlap, or less of the portion overlapped than not overlapped.

There may be no additional contact of any parts of the cam mechanism with the outside of the O-ring, thus reducing sources of opposing friction to the movement of the O-ring when a vibration or force acts upon the O-ring and therefore allowing movement of the resilient cushioning member.

The second end stop may comprise a face of the second cam portion. The first cam portion is preferably of sintered metal and the protrusion is preferably an integral part of the sintered metal cam portion.

Use of a ring over a protrusion is a simple, low cost, solution because O-rings are readily available. The second cam portion may be a moving cam portion which rotates with the clamp pin as the handle is operated and the first cam portion may comprise a fixed cam portion which is restrained so that it cannot rotate. One of the cam portions may include a cam and the other of the cam portions a cam follower which moves over the cam as the handle rotates to change the length of the cam mechanism.

Other advantages of this invention will become apparent to those skilled in the art from the following detailed description of the preferred embodiments, when read in light of the accompanying drawings.

BRIEF DESCRIPTION OF THE DRAWINGS

FIG. 4 (a)-(d) provide a variety of cross-sectional area for a protrusion of an end stop of an embodiment of the present invention wherein a protrusion supports an O-ring;

DETAILED DESCRIPTION OF THE INVENTION

Figure 1:
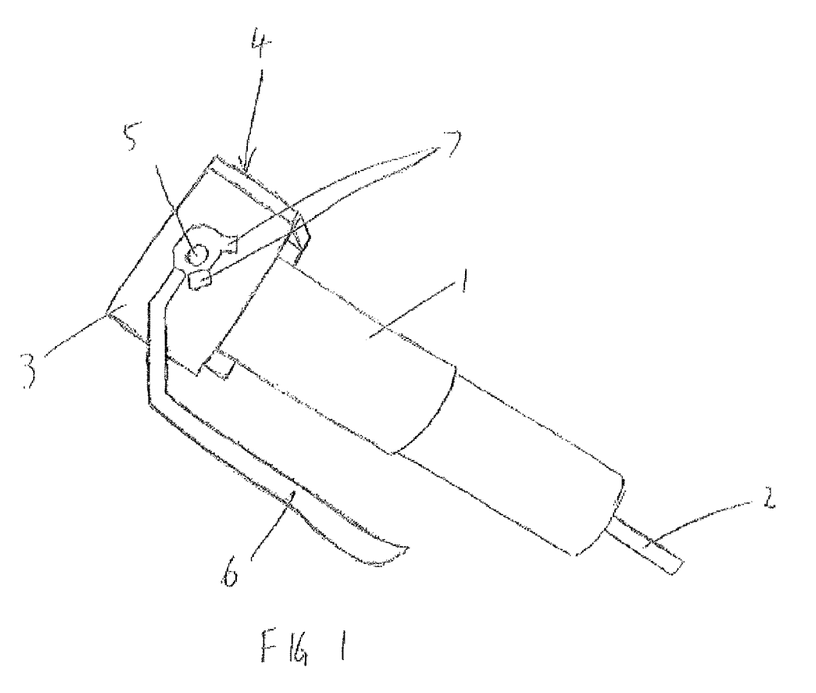
FIG. 1 provides a view of an embodiment of a steering column assembly of the present invention.

FIG. 1 provides a steering column assembly 4 according to an embodiment of the present invention comprising an adjustable shroud 1 which surrounds a steering shaft 2 and a locking mechanism 3. The locking mechanism 3 is operable between a locked position in which the adjustable shroud part is locked in position and an unlocked position in which the adjustable shroud part can be moved to set the reach and/or rake of the steering column assembly 4.

The locking mechanism 3 comprises a clamp pin 5, a locking handle 6 and a cam mechanism 7 fitted to the clamp pin 5. The cam mechanism 7 comprises first and second cam portions which can be moved relative to each other by operation of the locking handle 6 to vary the overall length of the cam mechanism 7. The unlocked position of the cam mechanism 7 is defined by contact of a first end stop of the first cam portion with a second end stop of the second cam portion.

Figure 2:
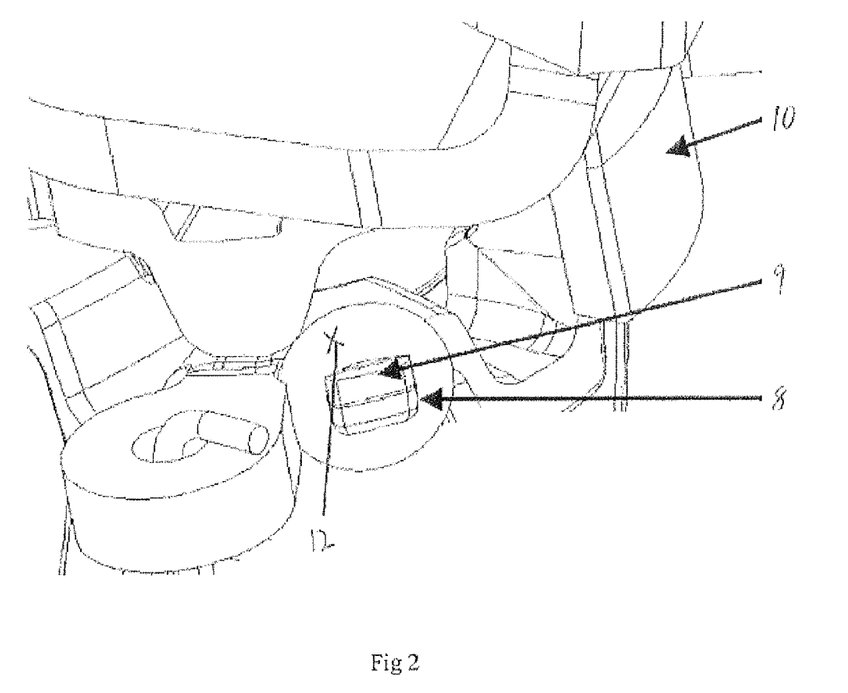
FIG. 2 provides an enlarged view of a steering column assembly of an embodiment of the present invention in the locked position.

FIG. 2 provides an enlarged view of the cam mechanism of the steering column assembly of FIG. 1 when locked. The end stop 9, in this case a protrusion on the fixed cam supports a resilient cushioning member 8, in this case an O-ring. The moving cam also includes another end stop 10. The resilient cushioning member 8 is loosely fitted in a groove of the protrusion. In the figures a marking 12 is shown for illustrative purposes.

When end stops 9 and 10 are moved into engagement, in the unlocked position of the cam mechanism as shown in FIG. 4, the resilient cushioning member 8 serves to dampen both the sound and the feeling of "clicking" due to the engagement.

Figure 3:
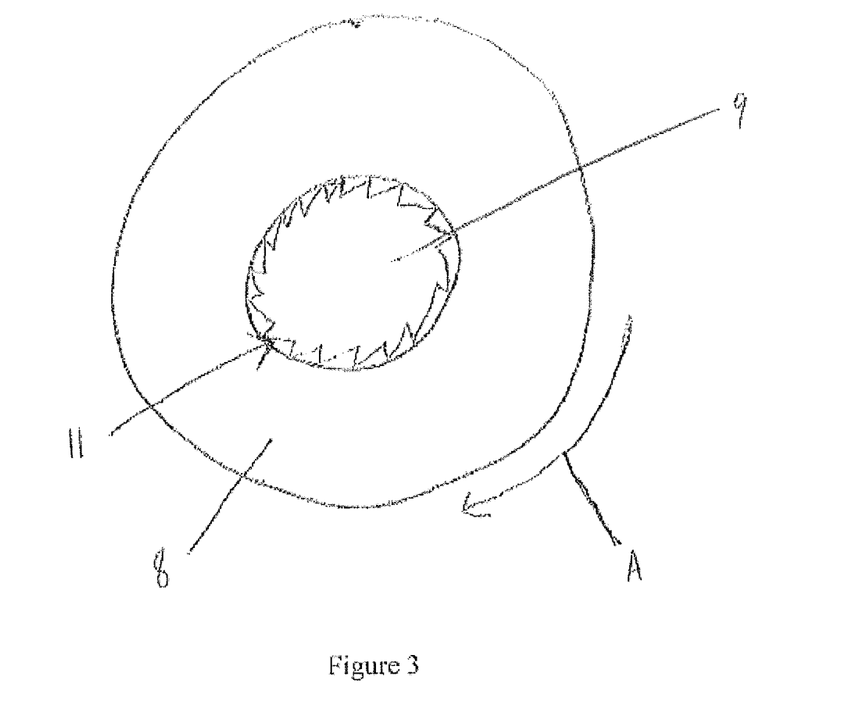
FIG. 3 provides an enlarged view of a protrusion with an O-ring of an embodiment of the present invention, further displaying movement of the O-ring.
Figure 4A:
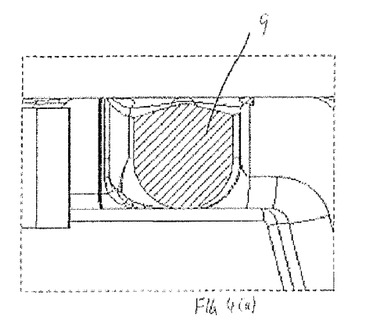
Figure 4B:
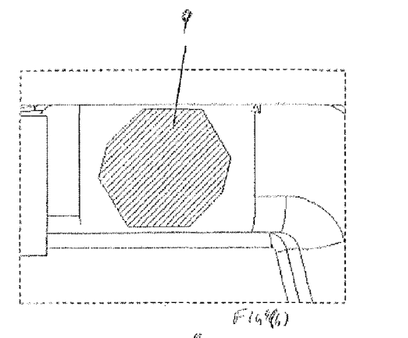
Figure 4C:
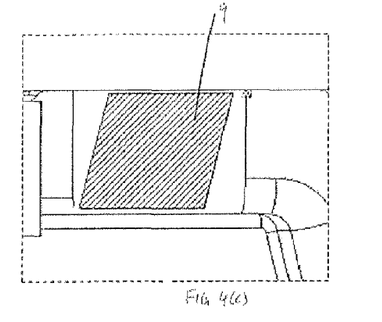
Figure 4D:
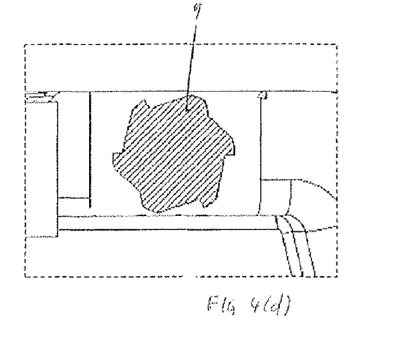

FIG. 3 shows the resilient cushioning member 8, looking at the protrusion/O-ring arrangement along the axis of the protrusion. As can be seen, the O-ring is free to rotate about its axis on the end stop 9. In this arrangement, the protrusion of the end stop 9 is fluted along its length, comprising an asymmetric toothed outer surface 11 which is in contact with the O-ring 8 that is fitted about the protrusion 9. This arrangement promotes rotation of the O-ring 8 in one direction over the other. This is because there is little resistance from the toothed outer surface 11 in one direction of rotation, but greater resistance of the toothed outer surface to the rotation of the O-ring 8 in the other direction through "biting" into the O-ring 8.

The protrusion of the end stop 9 can have any of a range of different cross sections. FIGS. 4 (a), (b), (c) and (d) provide several preferred shapes of the protrusions of the end stop 9 which supports the resilient cushioning member (not shown) of the present invention and help with rotation of the O-ring 8 during movement from the locked to the unlocked position and help prevent it rotating back when the cam mechanism is subsequently moved to the locked position.

Figure 5:
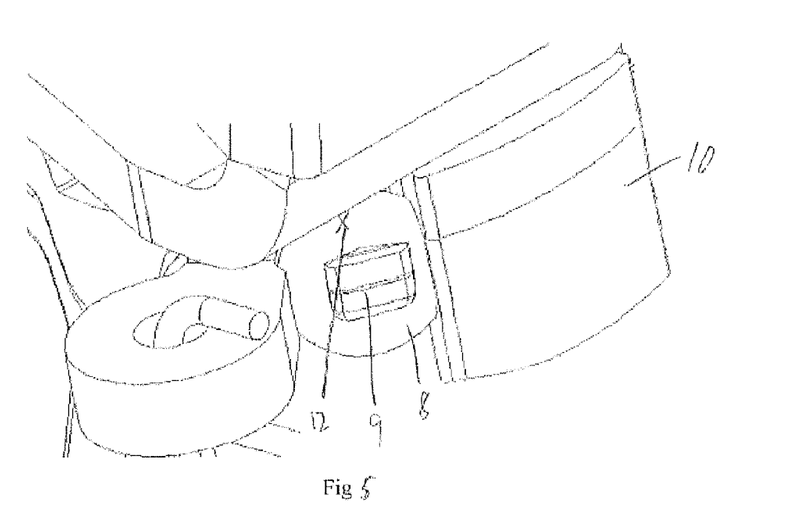
FIG. 5 provides an enlarged view of a steering column assembly of an embodiment of the present invention in the unlocked position.

FIG. 5 shows the cam mechanism of FIG. 2 when end stops 9 and 10 are moved into engagement in the unlocked position of the cam mechanism. The resilient cushioning system 8 serves to dampen both the sound and the feeling of "clicking" due to the engagement. It can be seen in this figure that the resilient cushioning member 8 is compressed at a portion to that which is compressed in FIG. 2, due to the engagement of the end stops 7. The marking 12 on the resilient cushioning member 8, shows that the O-ring 8 has moved relative to its position in FIG. 2 due to engagement with the end stop 10.

Figure 6:
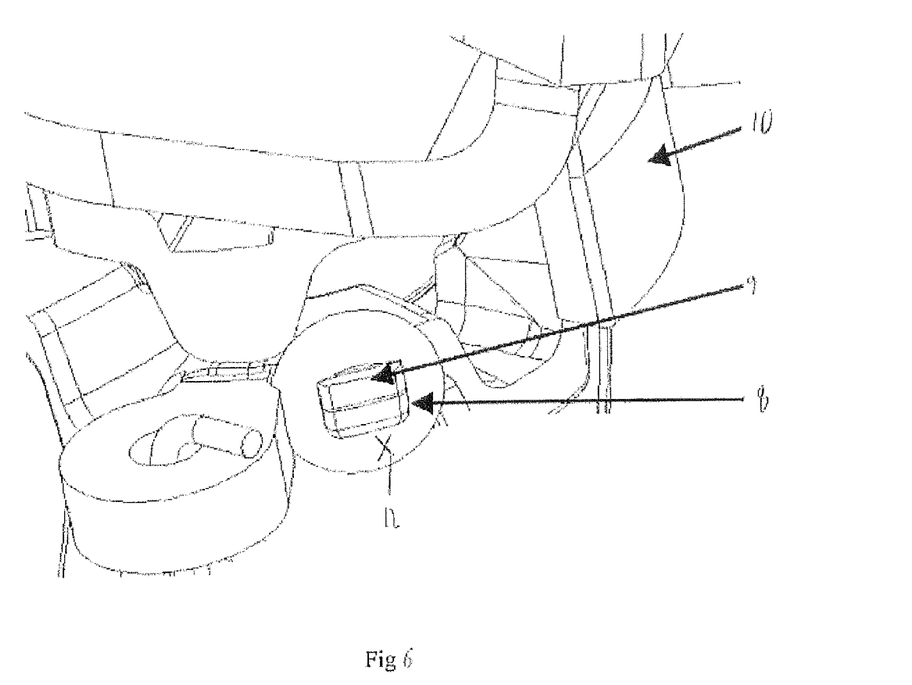
FIG. 6 provides an enlarged view of a steering column assembly of FIG. 2, but after many iterations of the locking/unlocking mechanism.

FIG. 6 shows the same mechanism as FIG. 2, after unlocking and locking the cam mechanism several times. As can be seen, the O-ring 8 has rotated relative to protrusion of the end stop 9 as depicted by the new location of the marking 12. This movement ensures that a different part of the O-ring 8, none of which overlaps with the original portion, provides the cushioning.

Figure 7:
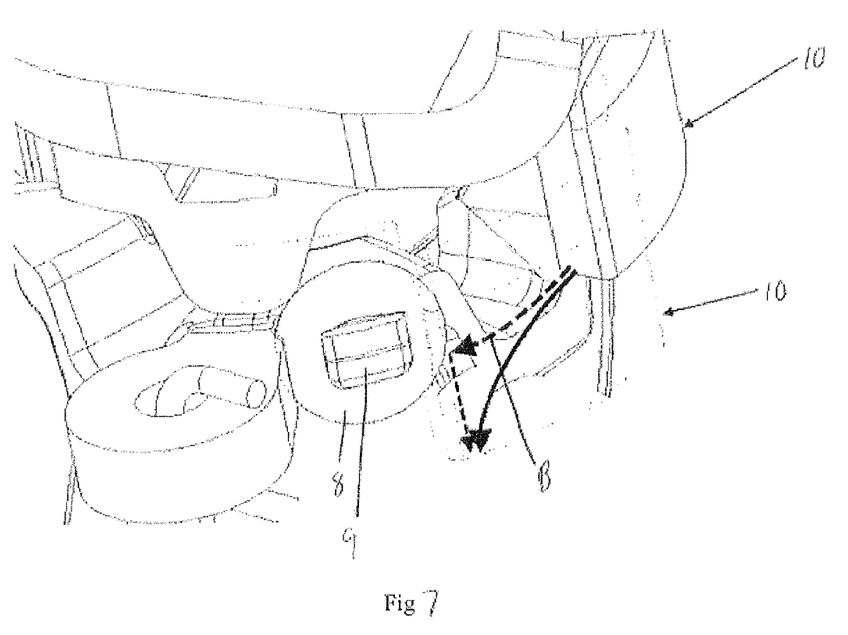
FIG. 7 provides an enlarged view of an embodiment of a steering column assembly displaying a representation of the movement from the unlocked position to the locked position.

FIG. 7 shows the force of the O-ring 8 and the movement B of the end stop 10 from the locked position as shown to the unlocked position. Engagement of the end stop 10 to the protrusion on the end stop 9 is cushioned by the O-ring 8, supported on the protrusion on the end stop 9. The arrows show that the force applied to the O-ring 8 when moving to the unlocking portion is applied at an oblique angle. The oblique angle referred to is an angle substantially within a plane perpendicular to the axis of the protrusion 9. This angle must a component which is tangential to the rotation of the O-ring 8. The oblique force applied creates a reaction force (shown by the other arrow) that tends to cause the O-ring 8 to rotate by a small amount each time it is compressed. This is especially advantageous when combined with the feature of the teeth, or other non-smooth profile that encourages the o-ring to rotate and discourages it from rotating back as shown in FIG. 3.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising an adjustable shroud which at least partially surrounds a steering shaft and a locking mechanism operable between a locked position in which the adjustable shroud is locked in position and an unlocked position in which the adjustable shroud can be moved to set the reach and/or rake of the steering column assembly, in which the locking mechanism comprises a clamp pin, a locking handle and a cam mechanism fitted to the clamp pin, in which the cam mechanism comprises first and second cam portions which can be moved relative to each other by operation of the locking handle, the unlocked position of the cam mechanism being defined by contact of a first end stop of the first cam portion with a second end stop of the second cam portion, wherein at least one of the end stops comprises a resilient cushioning member which provides cushioning as the at least one of the end stops engages the other end stop upon the locking mechanism reaching the unlocked position, wherein the resilient cushioning member is free to move; wherein on a first engagement, a portion of the resilient cushioning member makes contact with the other end stop; and on a second engagement, a different portion of the resilient cushioning member makes contact with the other end stop.

2. The steering column assembly according to claim 1, wherein movement between a position of the resilient cushioning member where the portion of the resilient cushioning member makes contact with the other end stop and a position of the resilient cushioning member where the different portion of the resilient cushioning member makes contact with the other end stop is caused by the force placed upon the resilient cushioning member during engagement between the at least one end stop and the other end stop.

3. The steering column assembly according to claim 1, wherein movement between a position of the resilient cushioning member where the portion of the resilient cushioning member makes contact with the other end stop and a position of the resilient cushioning member where the different portion of the resilient cushioning member makes contact with the other end stop is caused by vibrations acting upon the resilient cushioning member.

4. The steering column assembly according to claim 1 in which the resilient cushioning member comprises a rubber member.

5. The steering column assembly according to claim 1 in which the first end stop comprises a protrusion of the first cam portion.

6. The steering column assembly according to claim 5 in which the resilient cushioning member comprises a ring which is a fitted over the protrusion.

7. The steering column assembly according to claim 6 in which the resilient cushioning member comprises an O-ring which is loosely fitted around the protrusion.

8. The steering column assembly according to claim 7 which includes means for permitting the O-ring to rotate in one direction whilst restricting rotation of the O-ring in a return direction, either by completely restricting the O-ring from rotating in the return direction or making it harder for the O-ring to rotate in the return direction compared with the one direction.

9. The steering column assembly according to claim 8 in which the means comprises a plurality of ridges or teeth on the protrusion or the O-ring which cause the protrusion to grip the O-ring when the O-ring tries to rotate in the return direction and which provide less grip on the O-ring when it tries to rotate in the one direction.

10. The steering column assembly according to claim 8 in which the engagement between the at least one end stop and the other end stop creates an oblique force which acts upon the ring to cause the member to move in the one direction.

11. The steering column assembly according to claim 6 which includes a groove on the first end stop which locates the ring.

12. The steering column assembly according to claim 5 in which the protrusion in use rotates about its axis.

13. The steering column assembly according to claim 1 in which the second cam portion comprises a moving cam portion which rotates with the clamp pin as the handle is operated and the first cam portion comprises a fixed cam portion which is restrained so that it cannot rotate.

14. The steering column assembly according to claim 1 in which one of the cam portions includes a cam and the other of the cam portions includes a cam follower which moves over the cam as the handle rotates to change the length of the cam mechanism.

* * * * *